United States Patent
Kitamura

(10) Patent No.: US 8,339,693 B2
(45) Date of Patent: Dec. 25, 2012

(54) FABRICATION PROCESS FOR COMPUTER-GENERATED HOLOGRAMS, COMPUTER-GENERATED HOLOGRAM FABRICATED BY THAT PROCESS, AND COMPUTER-GENERATED HOLOGRAM

(75) Inventor: Mitsuru Kitamura, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 747 days.

(21) Appl. No.: 12/357,044

(22) Filed: Jan. 21, 2009

(65) Prior Publication Data

US 2009/0185246 A1    Jul. 23, 2009

(30) Foreign Application Priority Data

Jan. 22, 2008  (JP) .................................. 2008-011279
Nov. 10, 2008  (JP) .................................. 2008-287309

(51) Int. Cl.
G03H 1/08    (2006.01)
(52) U.S. Cl. ............................................................ 359/9
(58) Field of Classification Search .................. None
See application file for complete search history.

(56) References Cited

U.S. PATENT DOCUMENTS 4,568,141 A    2/1986  Antes

FOREIGN PATENT DOCUMENTS

| EP | 1 486 803 A3 | 12/2004 |
|---|---|---|
| JP | 2000-214750 A | 8/2000 |
| JP | 2001-013858 A | 1/2001 |
| JP | 2002-072837 A | 3/2002 |
| JP | 2004-264839 A | 9/2004 |
| JP | 2004-309709 A | 11/2004 |
| JP | 2005-215570 A | 8/2005 |
| JP | 3810917 B2 | 8/2006 |
| WO | 02/03109 A1 | 1/2002 |
| WO | 03/054797 A3 | 7/2003 |

OTHER PUBLICATIONS

Lohmann et al., "Binary Fraunhofer Holograms, Generated by Computer", Optical Society of America, Oct. 1967, vol. 6(10) pp. 1739-1748.

Lee, W.H., "Sampled Fourier Transform Hologram Generated by Computer", Optical Society of America, Mar. 1970, vol. 9(3), pp. 639-643.

Primary Examiner — Derek S Chapel
(74) Attorney, Agent, or Firm — Sughrue Mion, PLLC

(57) ABSTRACT

The invention provides a fabrication process for a computer-generated hologram wherein amplitude information and phase information are recorded on a given recording surface by means of computation by a computer. The computer-generated hologram is characterized by having a first direction and a second direction orthogonal to the first direction, and parallax in the first direction X alone. The hologram 1 comprises unit areas B1, B2, B3, . . . , Bm, . . . BM, each one having a given width in the second direction Y. In each unit area B1, B2, B3, . . . , Bm, . . . BM, there is a diffraction pattern having a spatial frequency Cm1, Cm2, Cm3, . . . , Cmt, . . . CmT that varies in the second direction.

9 Claims, 16 Drawing Sheets

(a)            (b)

FABRICATION PROCESS FOR COMPUTER-GENERATED HOLOGRAMS, COMPUTER-GENERATED HOLOGRAM FABRICATED BY THAT PROCESS, AND COMPUTER-GENERATED HOLOGRAM

This application claims benefit of Japanese Application No. 2008-011279 filed in Japan on Jan. 22, 2008, and, Japanese Application No. 2008-287309 filed in Japan on Nov. 10, 2008, the contents of which are incorporated by this reference.

BACKGROUND OF THE INVENTION

The present invention relates generally to a fabrication process for computer-generated holograms, a computer-generated hologram fabricated by that process, and a computer-generated hologram.

For the purpose of prevention of forgery or faking, it has so far been known that tradable coupons, credit cards or the like are provided with holograms. For such holograms, there is a computer-generated hologram (CGH) that is obtained by forming interference fringes on a given recording surface using computation by a computer (see Patent Publication 1).
Patent Publication 1: JP(A)2001-013858
Patent Publication 2: Patent No. 3810917
Patent Publication 3: JP(A)2000-214750
Patent Publication 4: JP(A)2002-72837
Patent Publication 5: JP(A)2005-215570
Patent Publication 6: JP(A)2004-309709
Patent Publication 7: JP(A)2004-264839
Non-Patent Publication 1:
    A. W. Lohmann and D. P. Paris: "Binary Franuhofer Holograms, Generated by Computer", Appl. Opt., 6, 10, pp. 1739-1748 (October 1967)
Non-Patent Publication 2:
    Wai Hon Lee: "Sampled Fourier Transform Hologram Generated by Computer", Appl. Opt., 9, 3, pp. 639-643 (March 1970)

However, the computer-generated hologram of Patent Publication 1 had a limited load on computation, but had a narrow viewing angle in the longitudinal direction. For instance, FIGS. 17 and 18 are illustrative of prior arts. FIG. 17 is a side view of the case where a computer-generated hologram 101 is irradiated with reconstructing illumination light 102a composed of monochromatic light. As shown in FIG. 17, diffracted light 103 occurring from the uppermost unit area is not diffracted in the direction of a viewing point E. For this reason, at the position of the viewing point E, a reconstructed image at the uppermost site of the computer-generated hologram 101 cannot be viewed, and the viewing angle in the longitudinal direction does not spread out either. On the other hand, FIG. 18 is illustrative of the case where a computer-generated hologram 101 is irradiated with reconstructing illumination light 102b composed of white light. As shown in FIG. 18, each unit area is only seen in monochrome irrespective of being irradiated with the reconstructing illumination light 102 composed of white light. For instance, of diffracted light rays 103 occurring from the uppermost unit area, a ray traveling toward a viewing point E is a blue component B of the incident white light 102b. For this reason, at the position of the viewing point E a reconstructed image at the uppermost site of the computer-generated hologram 101 is seen in blue light B, at the center site it is seen in green G, and at the lowermost site it is seen in red R (not shown).

It is here noted that one specific technique of using a point light source as a light source for object light from an original image thereby making sure a viewing angle in the vertical (longitudinal) direction is disclosed in Patent Publication 2. With the technique of Patent Publication 2, object light takes the form of a spherical wave spreading from the point light source on the original image so that the viewing angle in the vertical direction becomes wide. However, because the recording area on the hologram recording surface is limited in the vertical direction, there is a change in the vertical direction viewing angle depending on the depth position of an object.

SUMMARY OF THE INVENTION

Having been made in view of such problems with the prior art in mind, the present invention has for its object the provision of a process for the fabrication of a computer-generated hologram that is easy to view and excels in security, and a computer-generated hologram fabricated by that process.

According to the invention, the aforesaid object is accomplishable by the provision of a fabrication process for a computer-generated hologram wherein amplitude information and phase information are recorded on a given recording surface by means of computation by a computer, characterized by comprising a step of setting a first direction and a second direction orthogonal to said first direction in said computer-generated hologram, a step of setting parallax in said first direction alone, a step of setting unit areas, each one having a given width in said second direction, and a step of creating, in each unit area, a diffraction pattern having a spatial frequency that varies in said second direction.

The present invention is also characterized in that said step of setting a diffraction pattern having a spatial frequency that varies in the second direction is a step wherein said spatial frequency is gradually changed from one to another of said second direction.

The present invention is further characterized by comprising a step of recording an object to be recorded, using object light that spreads from a point light source set on the object to be recorded in said first direction and from a position different from said point light source in said second direction.

The present invention is further characterized by comprising a step of recording an object to be recorded, using object light that spreads from a linear light source set on the object to be recorded in said first direction and has a constant width in said second direction, and using reference light that converges on a given position determined for each unit area with respect to said second direction.

The present invention is further characterized by comprising a step of making said diffraction pattern from interference fringes.

The present invention is further characterized by comprising a step of making said diffraction pattern from a pattern capable of modulating a phase and amplitude.

The present invention is further characterized in that the computer-generated hologram is fabricated by the aforesaid computer-generated hologram fabrication process.

The aforesaid objects are achievable by the provision of a computer-generated hologram wherein amplitude information and phase information are recorded on a given recording surface by means of computation by a computer, characterized by comprising:
    a first direction and a second direction orthogonal to said first direction,
    parallax in said first direction alone,
    unit areas, each one having a given width in said second direction, and
    a diffraction pattern in each unit area that has a spatial frequency that varies in said second direction.

The present invention is also characterized in that the spatial frequency of said diffraction pattern that varies in the second direction changes gradually from one to another in each unit area.

According to the present invention, a computer-generated hologram is fabricated such that there is parallax in the first direction alone and the spatial frequency of the diffraction pattern in each unit area varies in the second direction. The computer-generated hologram thus makes sure a wider viewing angle because of a change in the angle of spreading of diffracted light in the second direction. In addition, there is no change in the second direction viewing angle depending on the depth position of an object, because the spreading of object light in the second direction can be determined irrespective of the position of the object. Moreover, when white light is used as reconstructing illumination light, it makes sure a wider viewing angle and enables a reconstructed image to be viewed in white.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

How to fabricate the hologram here is now explained with reference to the accompanying drawings.

Figure 1:
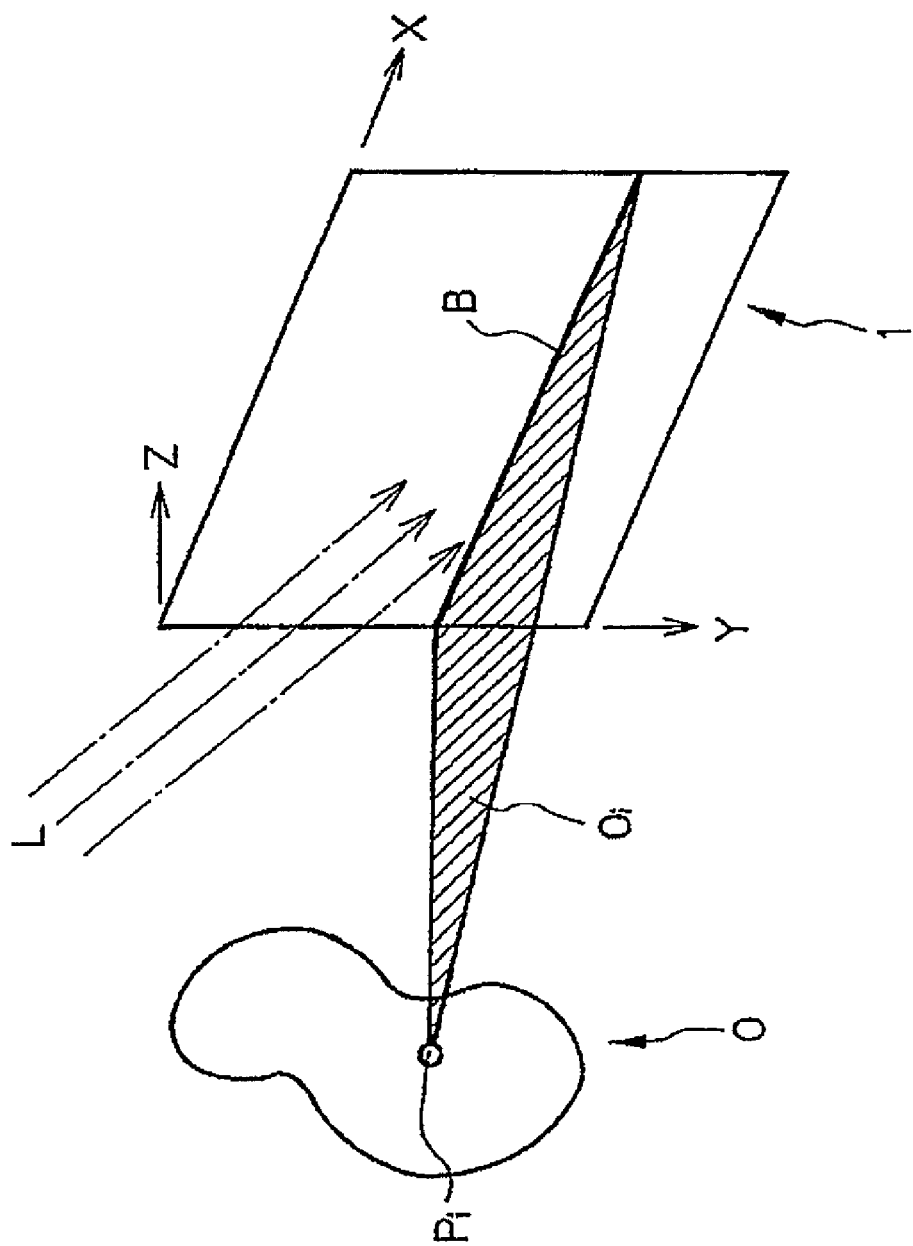
FIG. 1 is illustrative in perspective of the concept of how to record a computer-generated hologram according to the invention.
Figure 2:
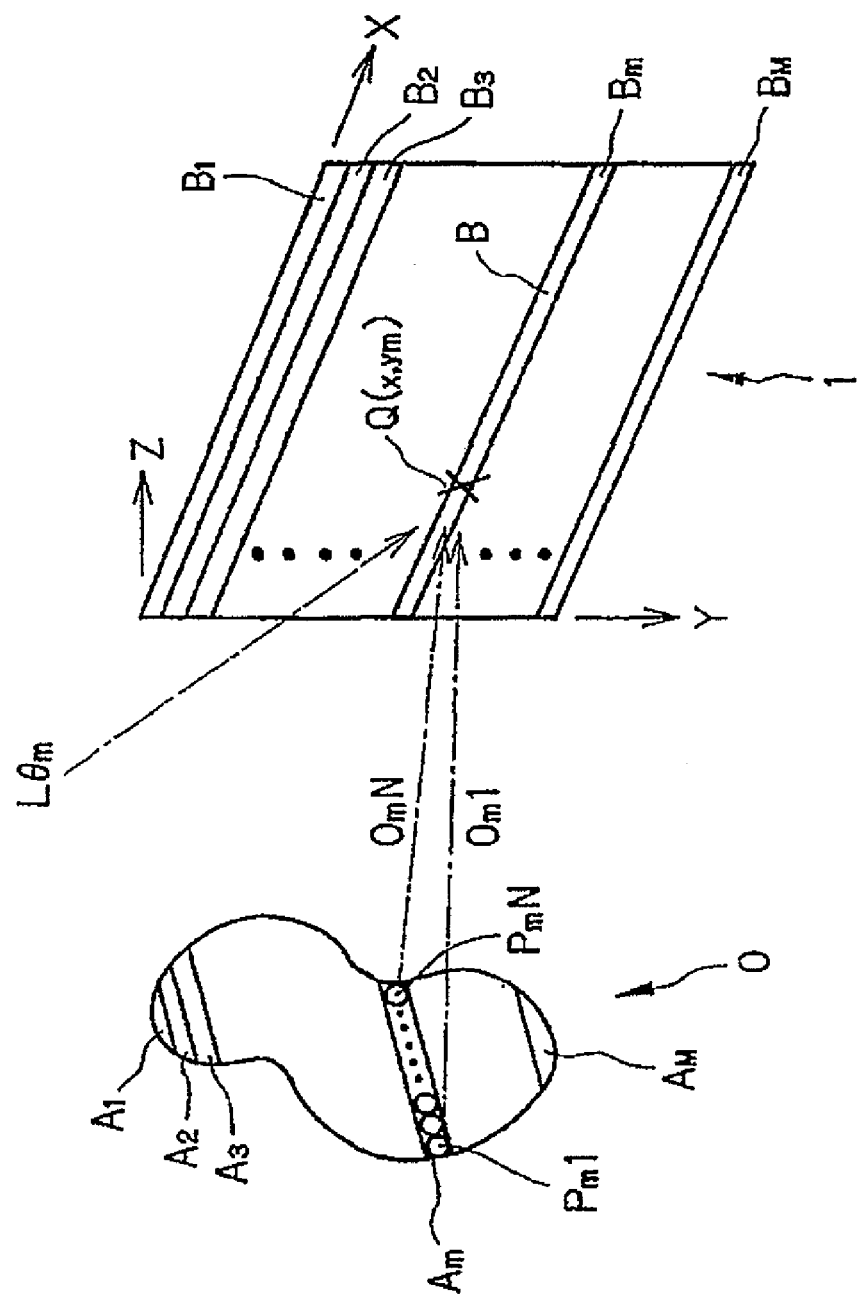
FIG. 2 is illustrative of one specific example based on the concept of computation of FIG. 1.
Figure 3:
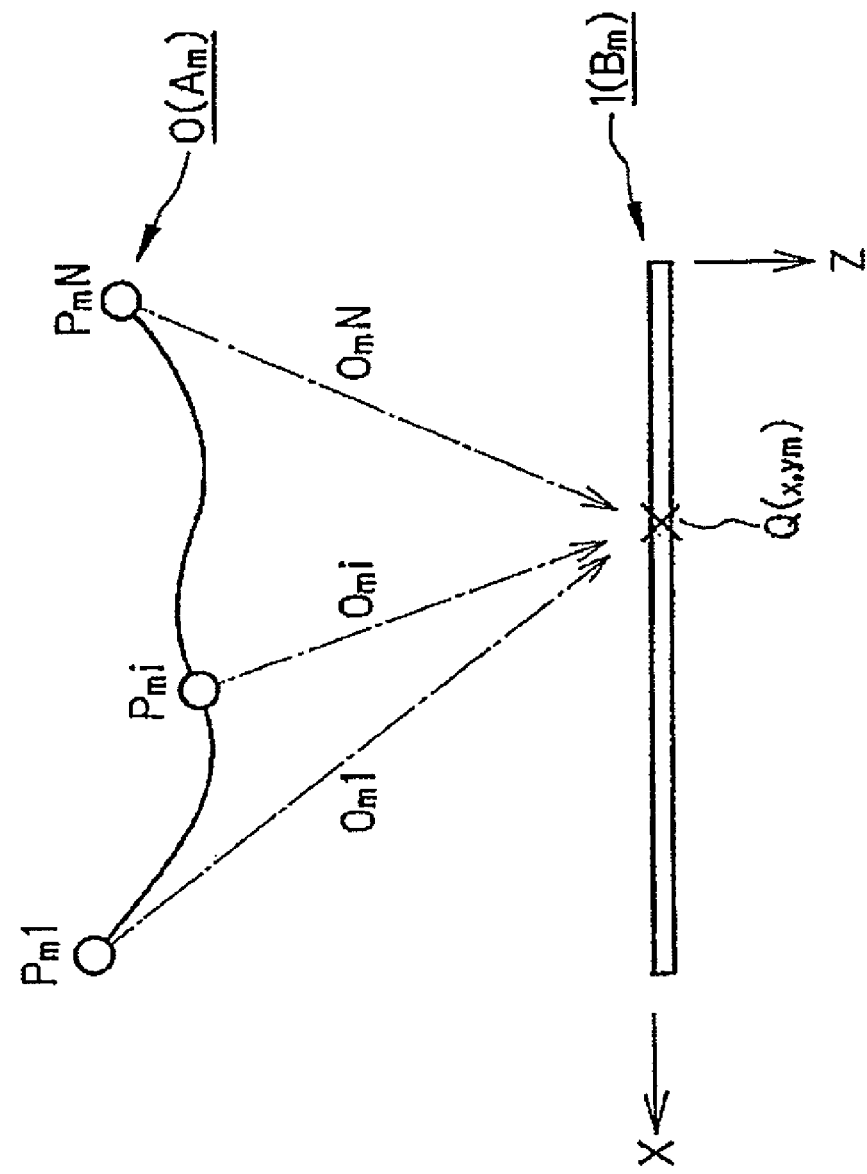
FIG. 3 is a top view illustrative of the concept of computation of FIG. 1.

In the embodiment here, a computer-generated hologram 1 is first fabricated. FIGS. 1, 2 and 3 are illustrative in basics of how to fabricate the computer-generated hologram 1.

First, there is a computer-generated hologram used, which is recorded by use of object light that spreads out from a point light source set on the original image to be recorded in a given one-dimensional direction alone. This fabrication process is based on what is set forth in Patent Publication 1. That is, as shown in FIG. 1, suppose here that object light Oi emanating from a point light source Pi on an original image O spread out in the horizontal direction only (within a plane parallel with the XZ plane), as shown in FIG. 1. Then, the object light oi will arrive at a linear area B only on a recording medium 1, whereas the object light Oi will not reach the rest of the recording medium 1 at all. When holograms are produced by an optical method, it is very difficult to limit such spreading of the object light; however, if a hologram is produced on a computer, the object light is easily controllable by mere correction of a computational formula. Therefore, similar limitation (that object light spreads out within only the plane parallel with the XZ plane) is imposed on object light emanating from all point light sources forming the original image O. The computer-generated hologram fabricated here becomes the one having only parallax in the horizontal direction.

FIG. 2 is a perspective view of a specific example of how to record the computer-generated hologram based on the above basic concept. In the example here, the original image O and the recording medium 1 (recording surface) are each divided by a multiplicity of parallel planes in the horizontal direction to define a multiplicity of linear unit areas. More specifically, the original image O is divided into a total of M unit areas A1, A2, A3, . . . , Am, . . . , AM, and the recording medium 1 is divided into a total of M unit areas B1, B2, B3, . . . , Bm, . . . , BM, too. When the original image O is a three-dimensional one, the respective unit areas A1, A2, A3, . . . , Am, . . . , AM are defined by dividing the surface portion of this solid body. The M unit areas on the original image O and the M unit areas on the recording medium 1 have one-to-one relations the way the m-th unit area Am on the original image O is corresponding to the m-th unit area Bm on the recording medium 1.

In the example of FIG. 2, it is noted that each of the unit areas A1, A2, A3, . . . , Am, . . . , AM has a width set equal to the Y-direction (perpendicular here) pitch of point light sources defined on the original image O, and the individual unit areas each define a linear area where the point light sources are lined up in a row. In the example shown, for instance, N point light sources Pm1 to PmN are lined up in a row on the m-th unit area Am.

Each of the unit areas B1, B2, B3, . . . , Bm, . . . , BM has a width set equal to the Y-direction pitch of point light sources defined on the original image O, and the individual unit areas each define a linear area where the points of computation are lined up two-dimensionally. The point of computation Q(x, ym) shown is indicative of one positioned in the m-th unit area Bm, and lies at a position indicated by a coordinate value (x, ym) in an XY coordinate system.

In this example, the interference wave intensity of the point of computation Q(x, ym) is found as follows. First, the unit area Am on the original image O corresponding to the unit area Bm to which that point of computation Q(x, ym) belongs is determined as the unit area to which computation is to be applied. And if the amplitude intensity at the position of the point of computation Q(x, ym) of an interference wave formed by object light Om1 to OmN coming out of the point light sources Pm1 to PmN in the unit area Am to be computed and reference light L$\theta$m is determined, that then gives the interference wave intensity of the desired point of computation Q(x, ym). The reference light L$\theta$m here is a monochromatic parallel ray parallel with, for instance, the YZ plane, and is incident on the recording medium 1 at the same angle irrespective of position. Alternatively, the angle of incidence $\theta$m of the reference light L$\theta$m may be determined on the basis of the setting of virtual illumination and a virtual viewing point that are supposed to be a virtual viewing environment; for instance, when there is a point light source supposed upon viewing, it may be set such that the angle of incidence $\theta$1 of reference light L$\theta$1 on the unit area B1 at the top end from the direction of a normal to the recording medium becomes a smaller angle $\delta$, and the angle of incidence $\theta$M of reference light L$\theta$M on the unit area BM at the bottom end becomes a larger angle $\beta$.

FIG. 3 is a top view of the concept of such computation, which is illustrative of the original image O and the recording medium 1 for the master CGH of FIG. 2, as viewed from above. As shown, the object light necessary to determine the interference wave intensity at the point of computation Q(x, ym) is limited to only object light Om1, ..., Om1, ..., OmN given out of N point light sources Pm1, ..., Pmi, ..., PmN within the unit area Am to be computed: there is no need of taking care of object light coming from all point light sources forming the original image O. Thus, if the given interference wave intensities are determined of all the points of computation Q(x, ym) defined on the recording medium 1 for the master CGH, there is then an intensity distribution of interference waves obtained that is to be recorded on the recording medium 1 for the master CGH, and if the obtained intensity distribution of interference fringes is somehow physically recorded, there is then the master CGH 1 obtained. Specifically, by recording the rectangle of a share corresponding to the intensity of interference fringes at a position corresponding to the point of computation, it is possible to fabricate the master CGH 1.

With reference to FIGS. 1, 2 and 3, there has been the mention of how to record information about the light sources on the m-th unit area Am defined on the original image O on the m-th unit area Bm defined on the recording medium 1 for the master CGH. In the model described with reference to this method, the unit areas Am and Bm are each a geometrically linear area; and all the point light sources are lined up unidimensionally, and all the points of computation are lined up two-dimensionally.

While the amplitude and phase of the object light at the points of computation Q on the divided areas are recorded by the interference fringes resulting from interference with the reference light as described above, it is here understood that the phase and amplitude may otherwise be recorded by the depth and width of grooves in one surface of a three-dimensional cell as shown in Patent Publications 4 and 5.

Alternatively, the amplitude and phase may be recorded by the method of A. W. Lohmann et al. set forth in Non-Patent Publication 1, the method of Lee set forth in Non-Patent Publication 2, etc.

Figure 4:
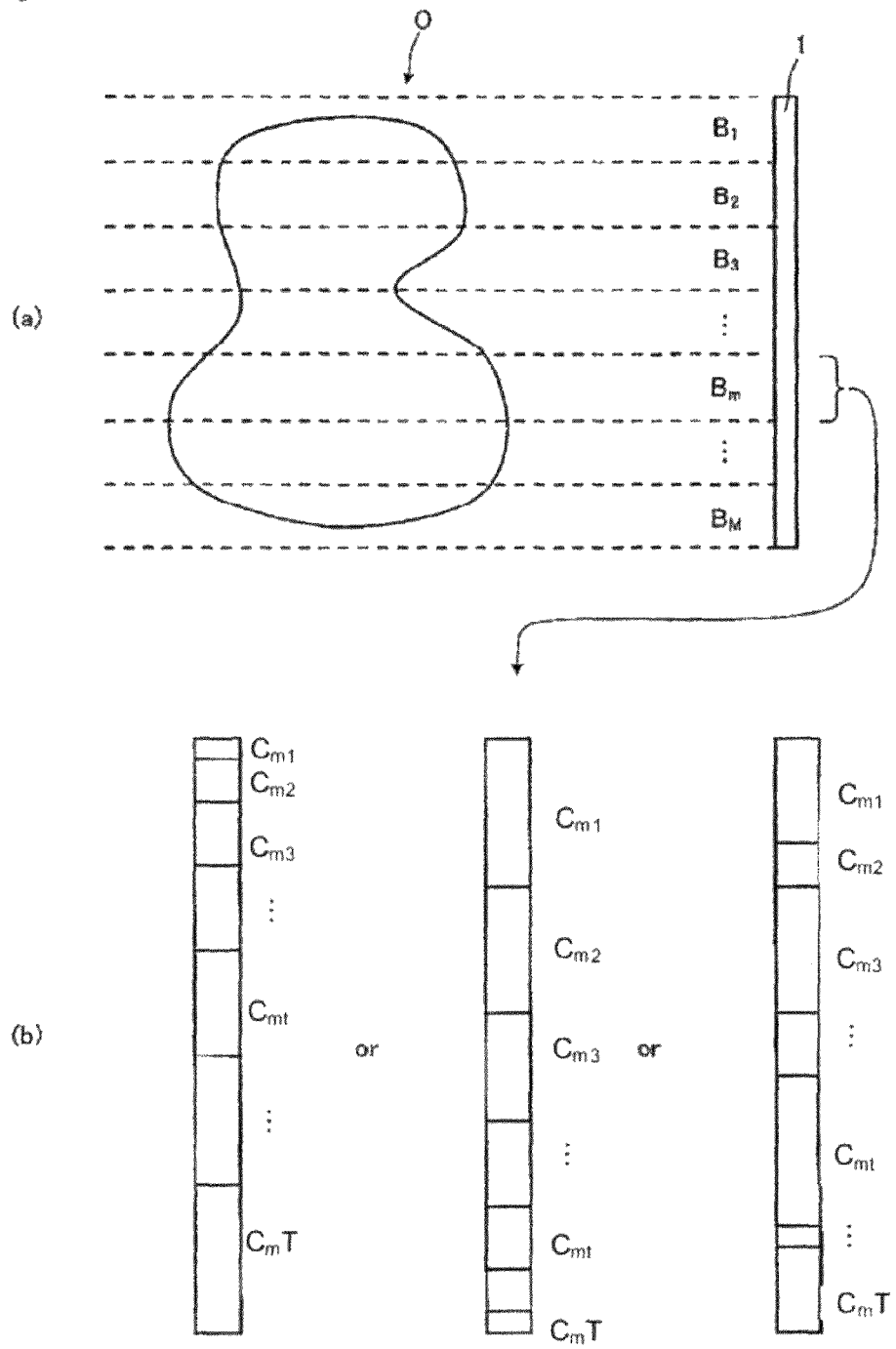
FIGS. 4(a) and 4(b) is illustrative of the architecture of the master CGH according to one embodiment of the invention.

FIG. 4 is illustrative of the architecture of the master CGH 1 here. FIG. 4(a) is illustrative of the system shown in FIG. 2, as viewed from the X direction that is the first direction, and FIG. 4(b) is illustrative on an enlarged scale of the master CGH 1, as viewed from the X direction.

Figure 5:
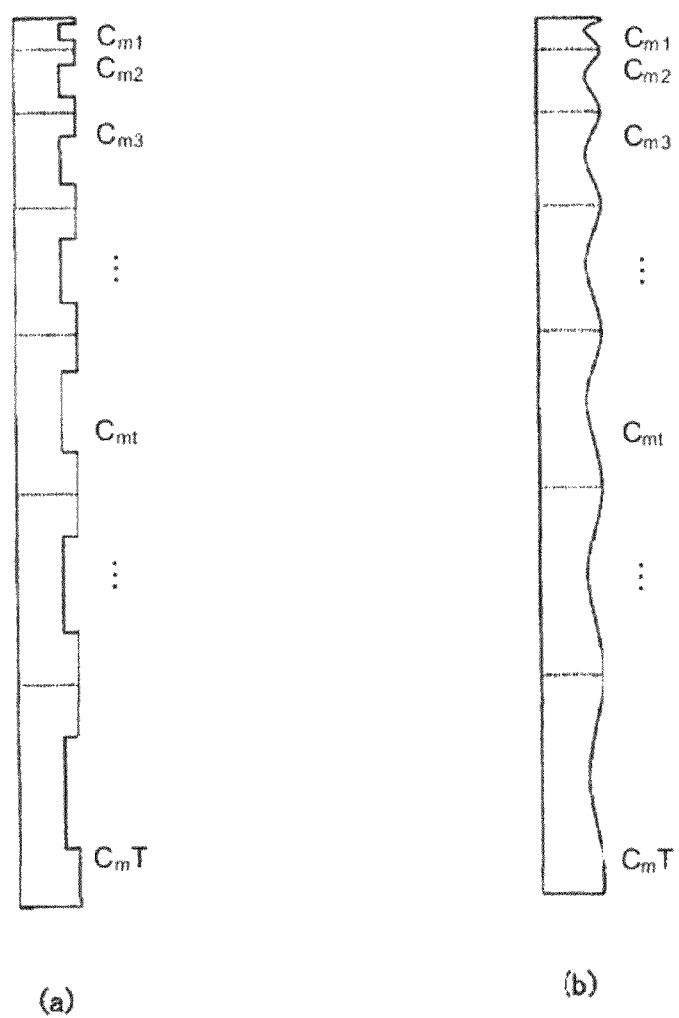
FIGS. 5(a) and 5(b) is illustrative of one specific structure of the master CGH according to one embodiment of the invention.

With the master CGH 1 here, the Y-direction viewing angle is varied by making interference fringes as a diffraction pattern in the unit areas BE, B2, B3, ..., Bm, ... BM such that the pitches (spatial frequencies) are varied in the Y direction that is the second direction. For instance, the Y-direction interference fringe pitches Cm1, Cm2, Cm3, ..., Cmt, ... CmT in the unit area Bm of the master CGH 1 may be produced in various patterns, as shown in FIG. 4(b). In the conceptual view of FIG. 4(b), the interference fringe pitches Cm1, Cm2, Cm3, ..., Cmt, ... CmT are shown; however, a physical interference fringe pattern is often formed as a relief pattern on the surface of the master CGH 1. In this case, as shown in FIG. 5, the section of the relief pattern may take on various shapes such as a rectangle (FIG. 5(a)), and a curve (FIG. 5(b)). Alternatively, the interference pitches may be determined by allowing the two-dimensional pattern to change periodically in the Y direction, rather than change in cross-sectional shape. While FIG. 5 shows that the interference fringe pitches varying in the Y direction change gradually from one to another in the unit area, it is understood that they may be fabricated in various patterns.

Figure 6:
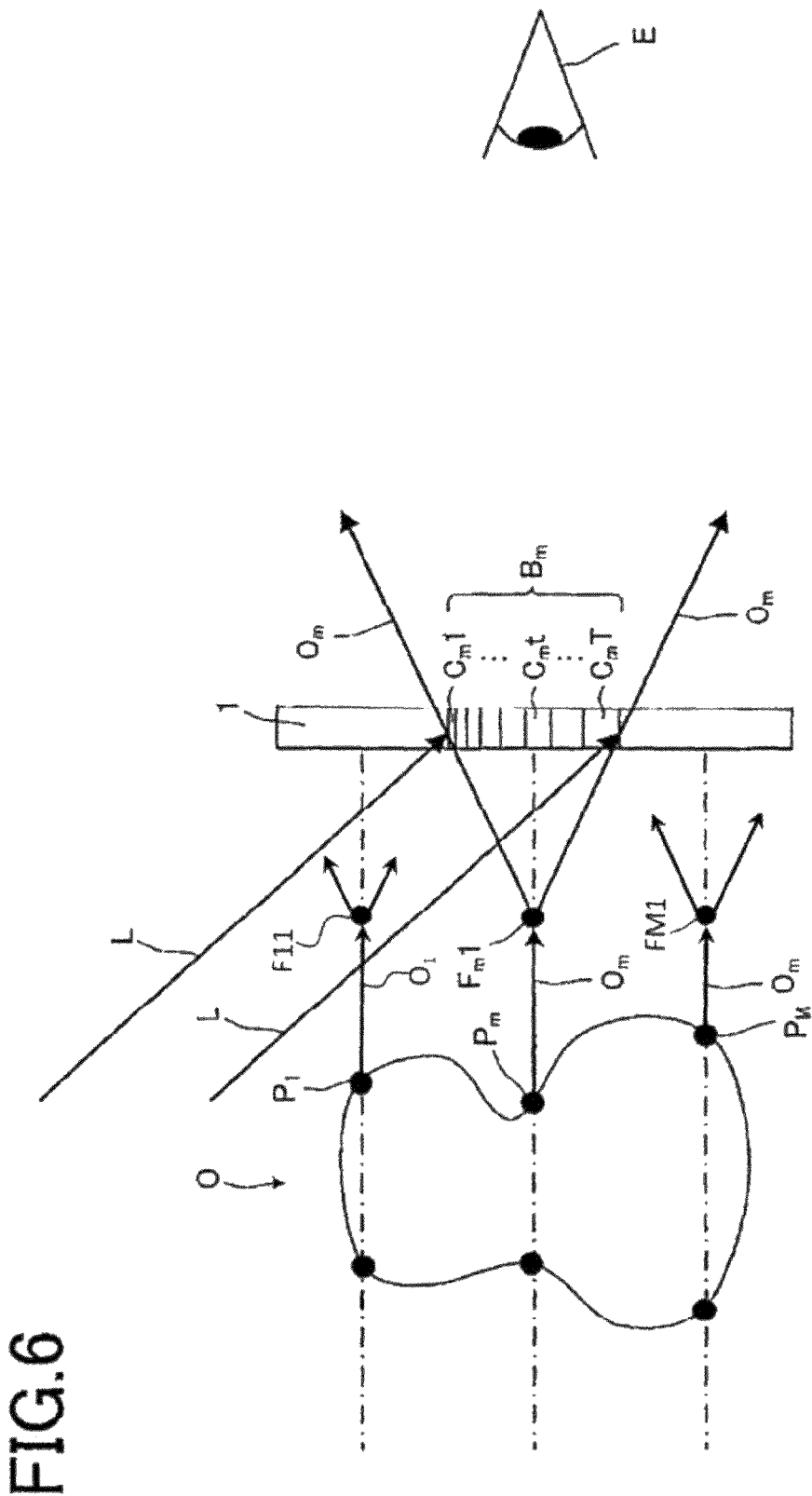
FIG. 6 is illustrative of the master CGH of Example 1 of the invention, which is being fabricated.
Figure 7:
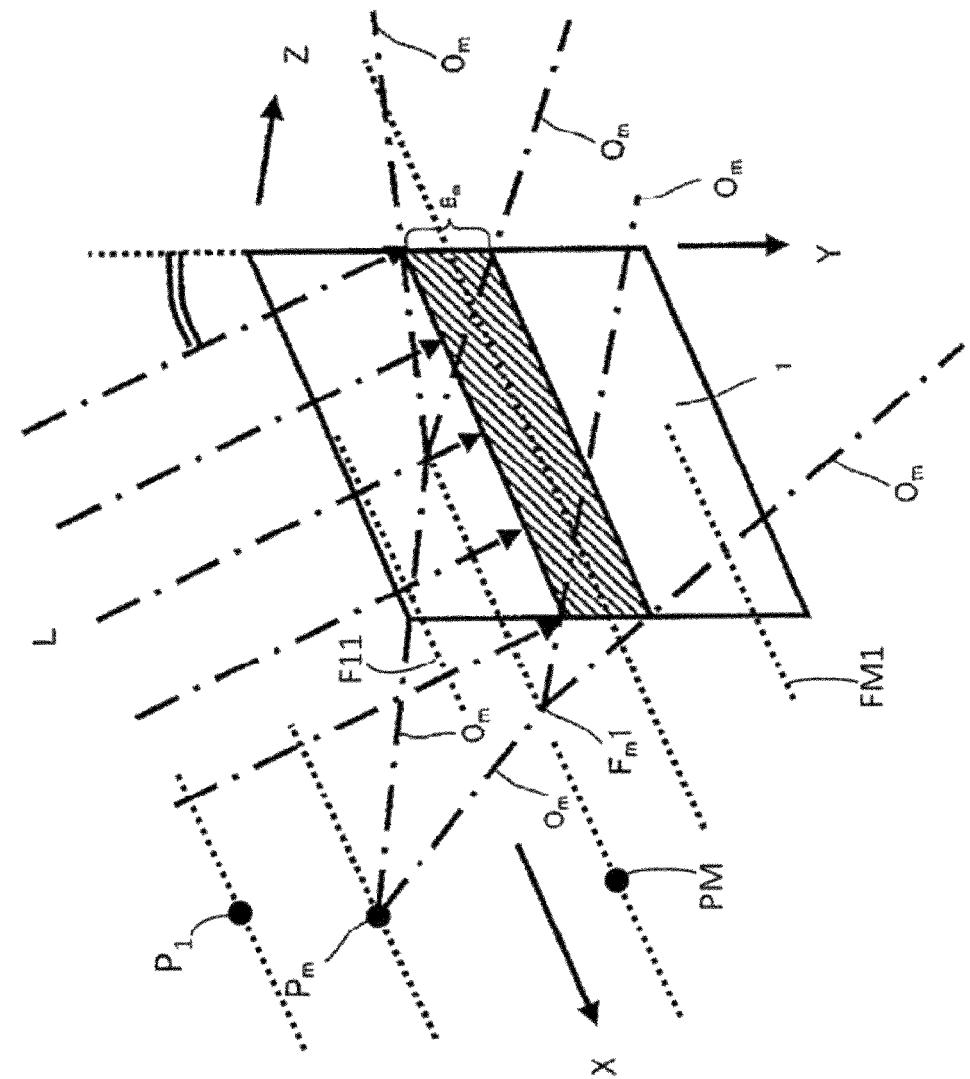
FIG. 7 is illustrative in perspective of the master CGH of Example 1 of the invention, which is being fabricated.

FIG. 6 is illustrative of the master CGH 1 of Example 1 according to the embodiment here, which is being fabricated. In Example 1, the position of divergence of object light Om in the Y direction of the light source is set at a position of divergence Fm1 of the master CGH 1 that is located on the side of the CGH opposite to a viewer. Accordingly, with respect to the X direction, the object light Om spreads out from the point light sources P1 ... Pm ... PM, and does not spread out in the Y direction, and with respect to the Y direction, the object light Om emanates from the positions of divergence F11 ... Fm1 ... FM1 and spreads out, as shown in FIG. 7. For this reason, some astigmatism is produced; however, there is little influence because the distance between the original image O and the master CGH 1 is very short.

As the light sources are set in this way, and as the hologram surface (i.e., the unit area Bm of the master CGH 1) is irradiated with the reference light L at a given angle of incidence for interference of the object light Om with the reference light L, it causes interference fringes having interference fringe pitches Cm1, Cm2, Cm3, ..., Cmt, ... CmT to appear in the unit area Bm of the master CGH 1 shown in FIG. 6. In Example 1 here, the interference fringe pitches appear in such a way as to spread out from above to below the paper. That is, the master CGH 1 is fabricated such that the spatial frequency on the side of the interference fringe pitch Cm1 becomes high and the spatial frequency on the side of the interference fringe pitch CmT becomes low.

Figure 8:
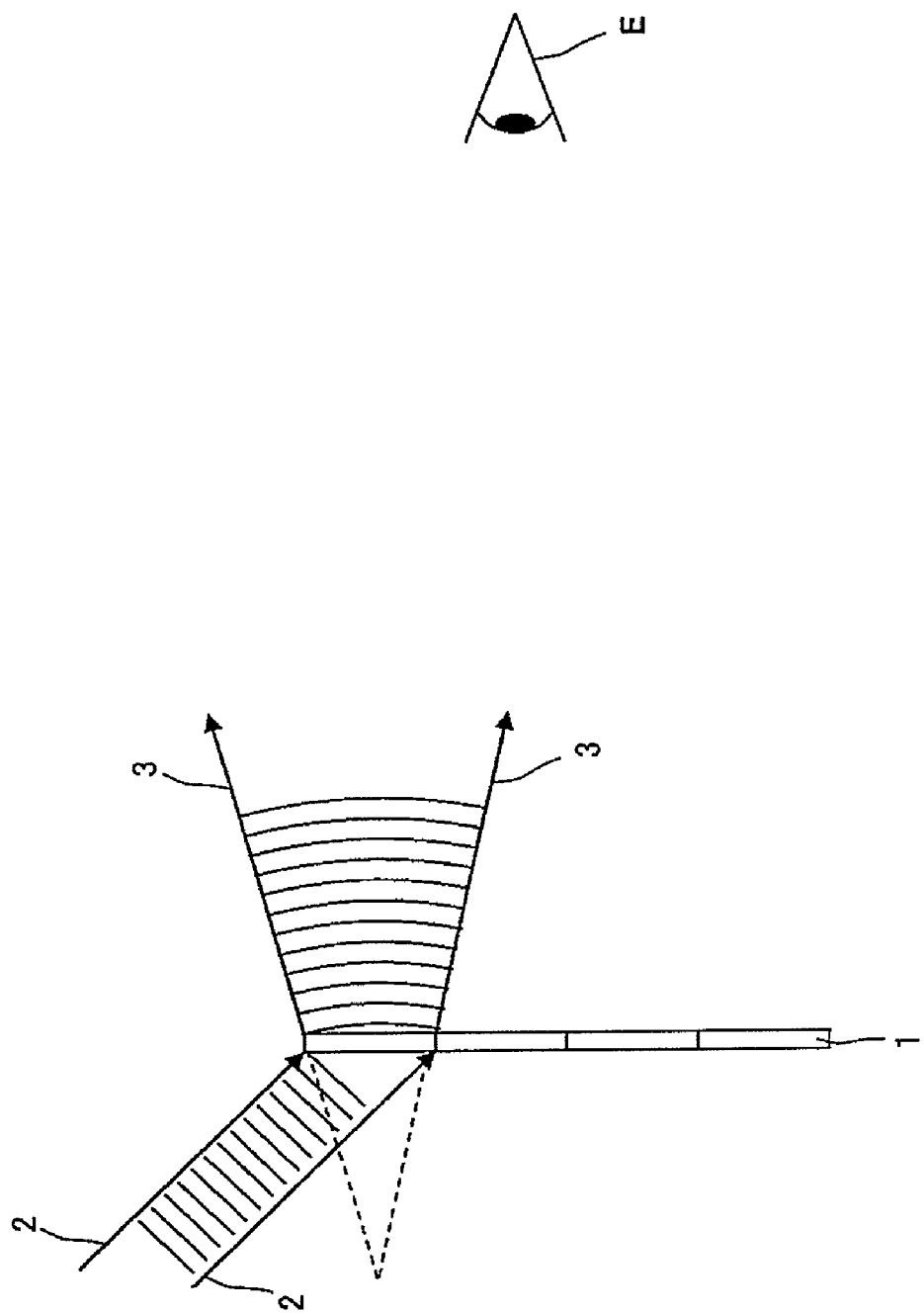
FIG. 8 is illustrative of the case where the master CGH of Example 1 of the invention is irradiated with reconstructing illumination light composed of monochromatic light.

FIG. 8 is illustrative of the case where the master CGH 1 fabricated as in Example 1 shown in FIGS. 6 and 7 is irradiated with reconstructing illumination light 2 composed of monochromatic light. When the master CGH 1 shown in FIGS. 6 and 7 is irradiated with the monochromatic reconstructing illumination light 2, the diffracted light 3 diffracted through the master CGH 1 spreads out circularly as viewed from the side, traveling while there is a viewing angle becoming wide in the Y direction.

Figure 9:
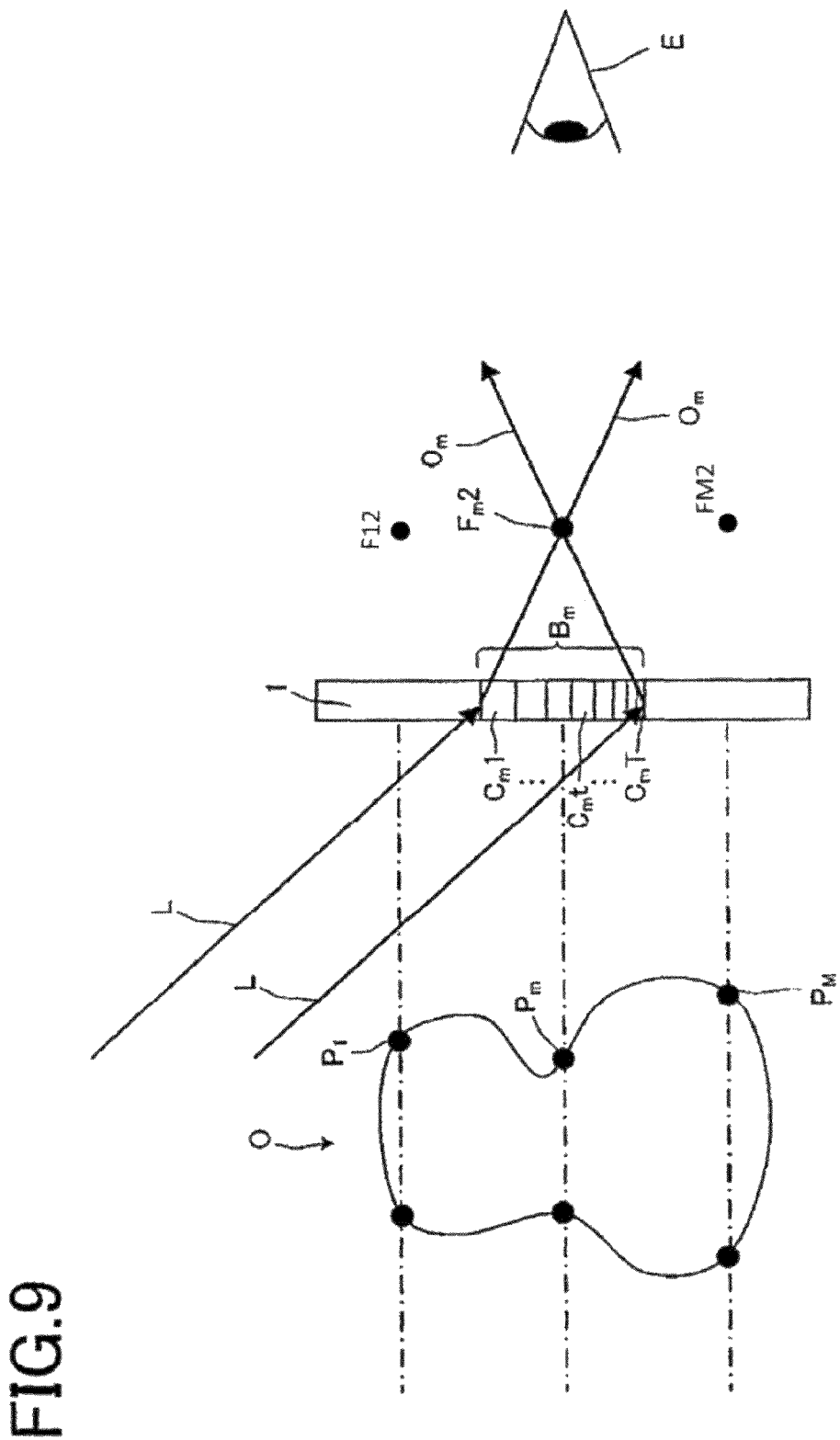
FIG. 9 is illustrative of the master CGH of Example 2 of the invention, which is being fabricated.

FIG. 9 is illustrative of the master CGH 1 of Example 2 according to the embodiment here, which is being fabricated. In Example 2 here, the position of convergence of the object light Om in the Y direction is set at a position of convergence Fm2 of the master CGH 1 located on the viewer side. Accordingly, with respect to the X direction vertical to the paper, the object light Om emanates from the point light sources P1 ... Pm ... PM without spreading out in the Y direction, and with respect to the Y direction, the object light Om emanates from the positions of convergence F12 ... Fm2 ... FM2. For this reason, some astigmatism is produced; however, there is little influence because the distance between the original image O and the master CGH 1 is very short.

As the light sources are set in this way, and as the hologram surface (i.e., the unit area Bm of the master CGH 1) is irradiated with the reference light L at a given angle of incidence for interference of the object light Om with the reference light L, it causes interference fringes having interference fringe pitches Cm1, Cm2, Cm3, ..., Cmt, ... CmT to appear in the unit area Bm of the master CGH 1 shown in FIG. 9. In Example 2 here, the interference fringe pitches appear in such a way as to become narrow from above to below the paper. That is, the master CGH 1 is fabricated such that the spatial frequency on the side of the interference fringe pitch Cm1 becomes low and the spatial frequency on the side of the interference fringe pitch CmT becomes high.

Figure 10:
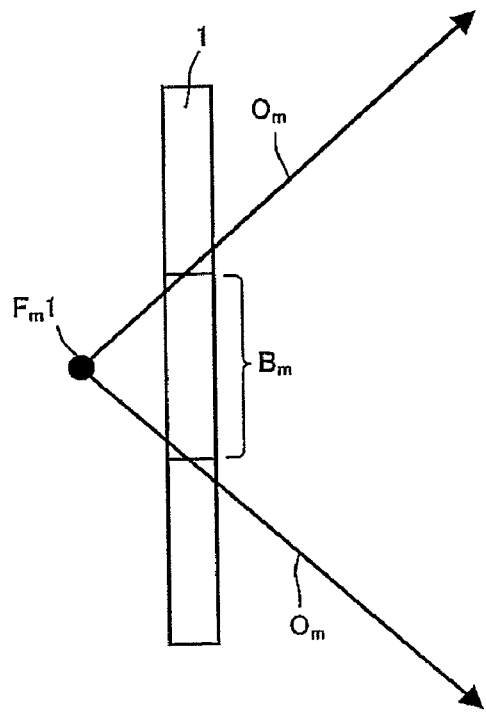
FIG. 10 is illustrative of another example of the position of divergence Fm1 in the Y direction.
Figure 11:
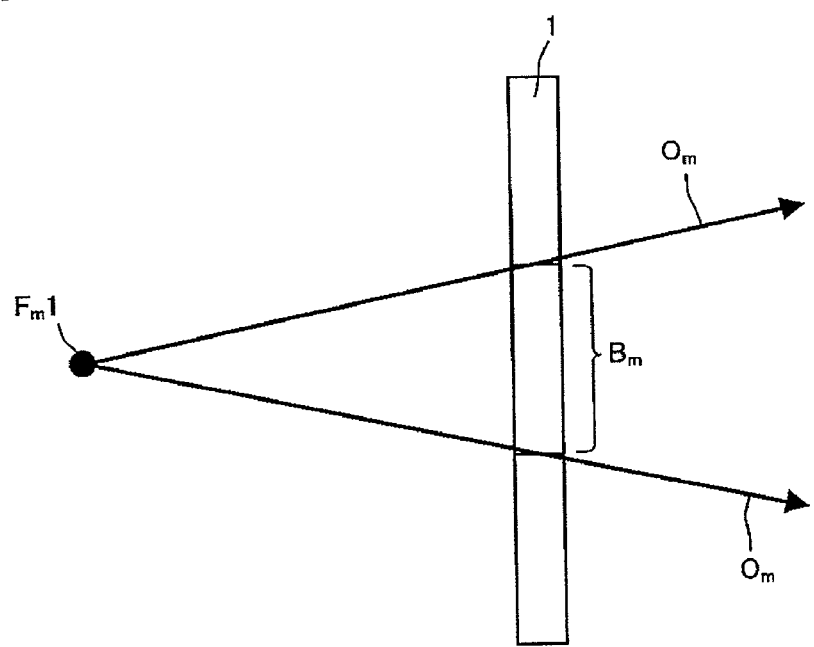
FIG. 11 is illustrative of yet another example of the position of divergence Fm1 in the Y direction.
Figure 12:
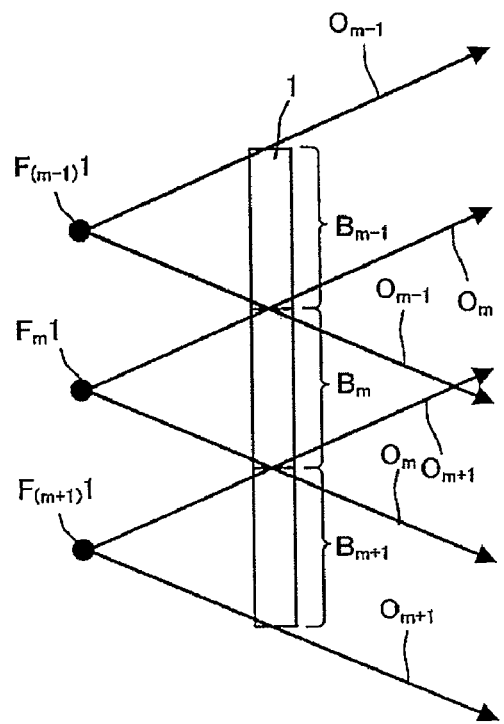
FIG. 12 is illustrative of a further example of the position of divergence Fm1 in the Y direction.
Figure 13:
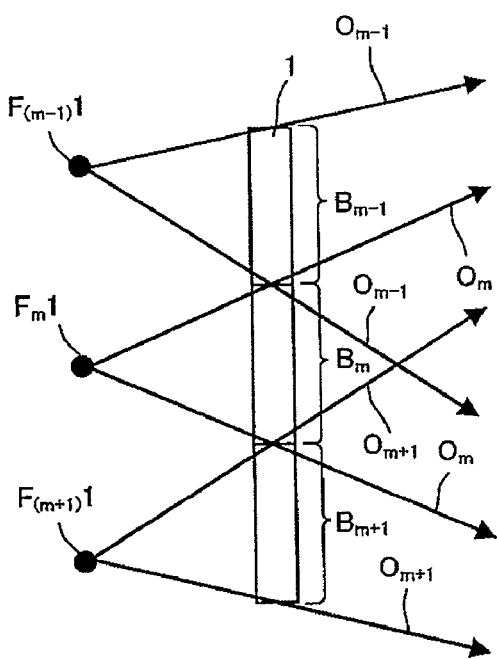
FIG. 13 is illustrative of a further example of the position of divergence Fm1 in the Y direction.

FIGS. 10, 11, 12 and 13 are illustrative of several examples of the positions of divergence Fm1 or convergence Fm2 of object light with respect to the Y direction. FIG. 10 shows that the position of divergence Fm1 is located near the master CGH 1; in this case, the Y-direction viewing angle becomes wider. FIG. 11 shows that the position of divergence Fm1 is located far away from the master CGH 1; in this case, the Y-direction viewing angle becomes narrower. FIG. 12 shows that the relation in position of the master CGH 1 to the position of divergence Fm1 remains constant with respect to all the unit areas B1, B2, B3, ..., Bm, ... BM; in this case, design is facilitated with more reduced loads on computation. FIG. 13 shows that the relation in position of the master CGH 1 to the position of divergence Fm1 varies for each unit area B1, B2, B3, ..., Bm, ... BM; in this case, the Y-direction viewing angle can be changed for each unit area B1, B2, B3, ..., Bm, ... BM. In the example of FIG. 13, there is a wider range in which the reconstructing light traveling from the unit areas at the top or bottom end toward the viewer can be seen.

Figure 14:
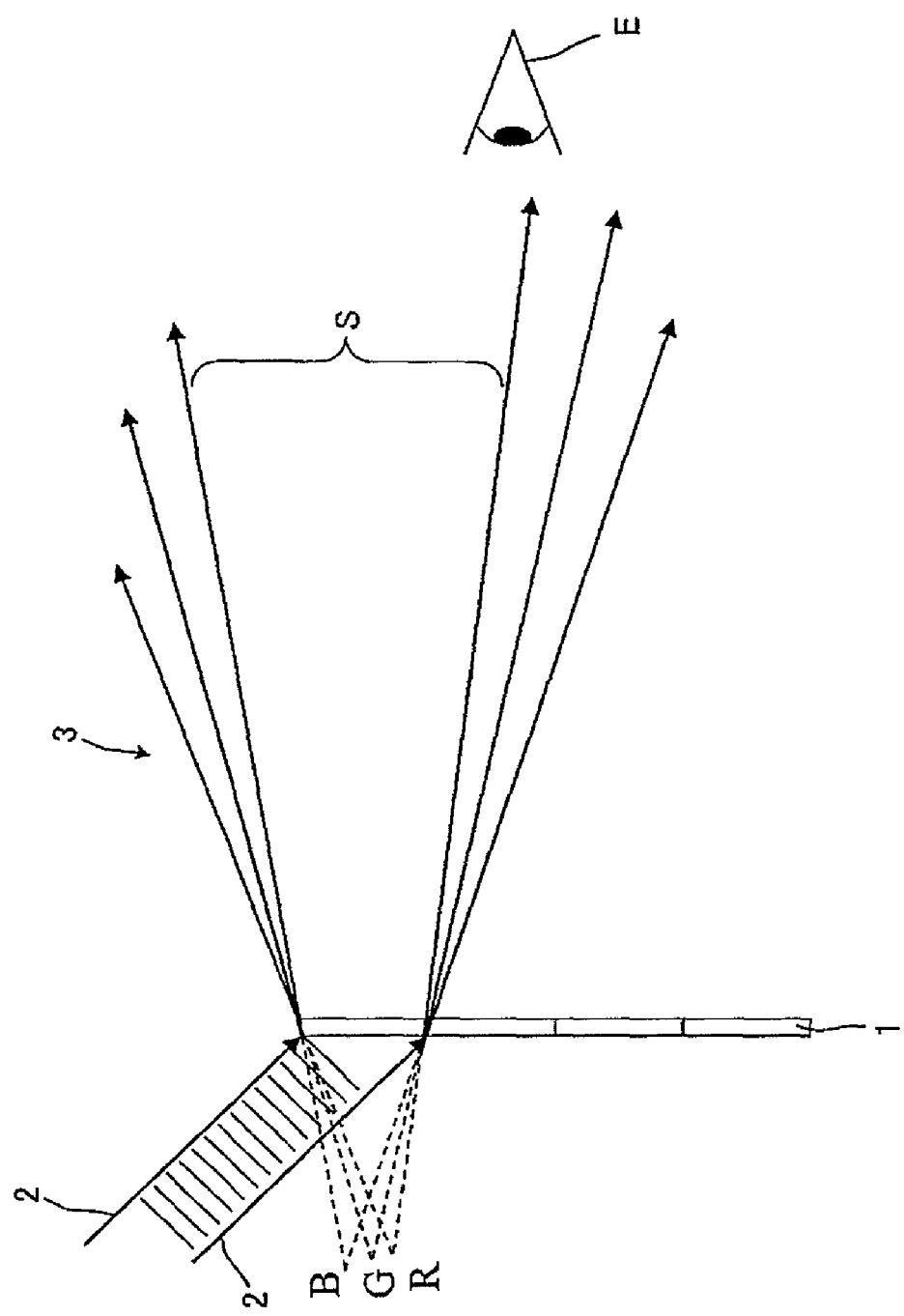
FIG. 14 is illustrative of the case where the master CGH of Example 1 is irradiated with reconstructing illumination light composed of white light.

FIG. 14 is illustrative of the case where the master CGH 1 fabricated as in Example 1 of FIG. 6 is irradiated with the reconstructing illumination light 2 composed of white light. When the master CGH 1 of FIG. 6 is irradiated with the reconstructing illumination light 2 composed of white light, the diffracted light 3 that varies for each wavelength of light is generated from the master CGH 1. In the embodiment here, the diffracted light 3 corresponding to red, green, and blue travels in different directions, as shown in FIG. 14; however, in an area S including all red, green and blue of the diffracted light 3 the master CGH 1 can be seen in white.

Figure 15:
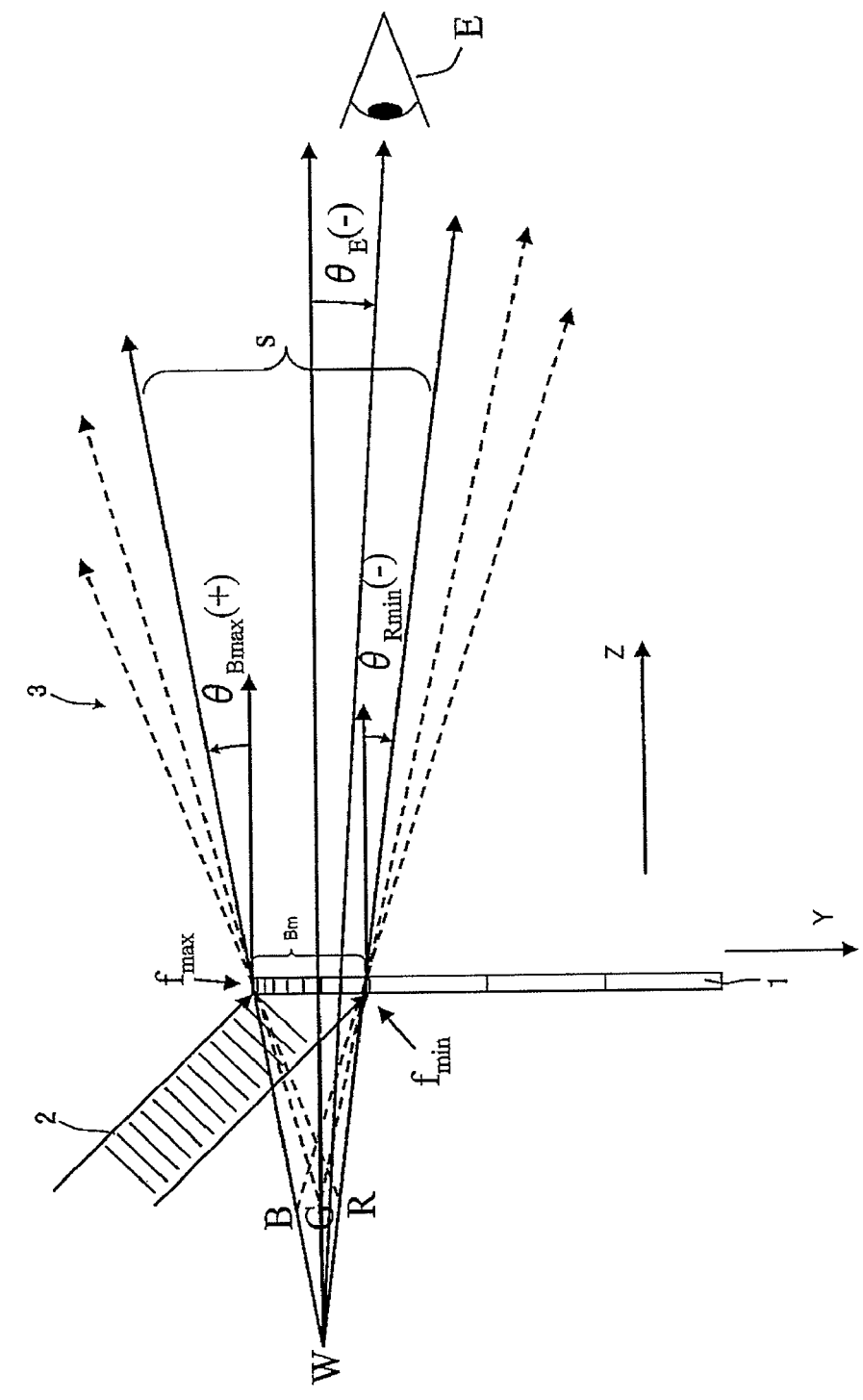
FIG. 15 is illustrative of the condition under which the master CGH can be viewed in white.

The condition under which the master CGH 1 can be viewed in white is now explained in details. FIG. 15 is illustrative of the condition under which the master CGH can be seen in white.

In each unit area Bm of the master CGH 1, let θBMax be indicative of the direction of diffraction of the shortest wavelength λB (for example, 380 nm) to be used of the reconstructing illumination light 2 incident on a place having the Y-direction maximum spatial frequency (fmax) on condition that in the ZY plane, the Z direction is at the angle of 0° and the counterclockwise direction is at a positive angle, and θRmin be indicative of the direction of diffraction of the longest wavelength λR (for example, 780 nm) to be used of the reconstructing illumination light 2 incident on a place having the Y-direction minimum spatial frequency (fmin). Here if a certain relation or the following condition (1) is satisfied, there is then a position where each unit area Bm of the master CGH 1 can be viewed in white.

$$\theta R_{min} < \theta B_{max} \quad (1)$$

Here the angle θ like the angle of diffraction is supposed to be such that in the ZY plane, the Z direction is at the angle of 0° and the counterclockwise direction is at a positive angle, and the widest possible range for θ is supposed to be $-\pi/2 < \theta < \pi/2$.

When the following diffraction formula is used, $$1/f = \lambda/(\sin\theta out - \sin\theta in)$$

where f is the Y-direction spatial frequency, λ is the wavelength, θin is the angle of incidence of incident light and θout is the angle of output of diffracted light, there are then $$\theta R_{min} = \sin^{-1}(f_{min} \cdot \lambda R + \sin\theta L)$$

$$\theta B_{max} = \sin^{-1}(f_{max} \cdot \lambda B + \sin\theta L)$$

where θL is the angle of incidence of incident light. Therefore, to have a position where each unit area Bm of the master CGH 1 can be viewed in white, θRmin and θBmax are substituted in condition (1) to satisfy the following condition (2). Moreover, to allow each unit area Bm of the master CGH 1 to be viewed in white at a viewing position, it is preferable to satisfy the following condition (3).

$$f_{min} \cdot 2R < f_{max} \cdot \lambda B \quad (2)$$

$$\theta R_{min} < \theta E < \theta B_{max} \quad (3)$$

where θE is the angle that directs from a point of intersection W toward the eye B where W is the point of intersection of extensions of an arrow giving θBmax and an arrow giving θRmin.

Accordingly, if conditions (2) and (3) are satisfied for each of all the unit areas Bm of the master CGH 1, the whole CGH can then be viewed in white at the viewing position.

Figure 16:
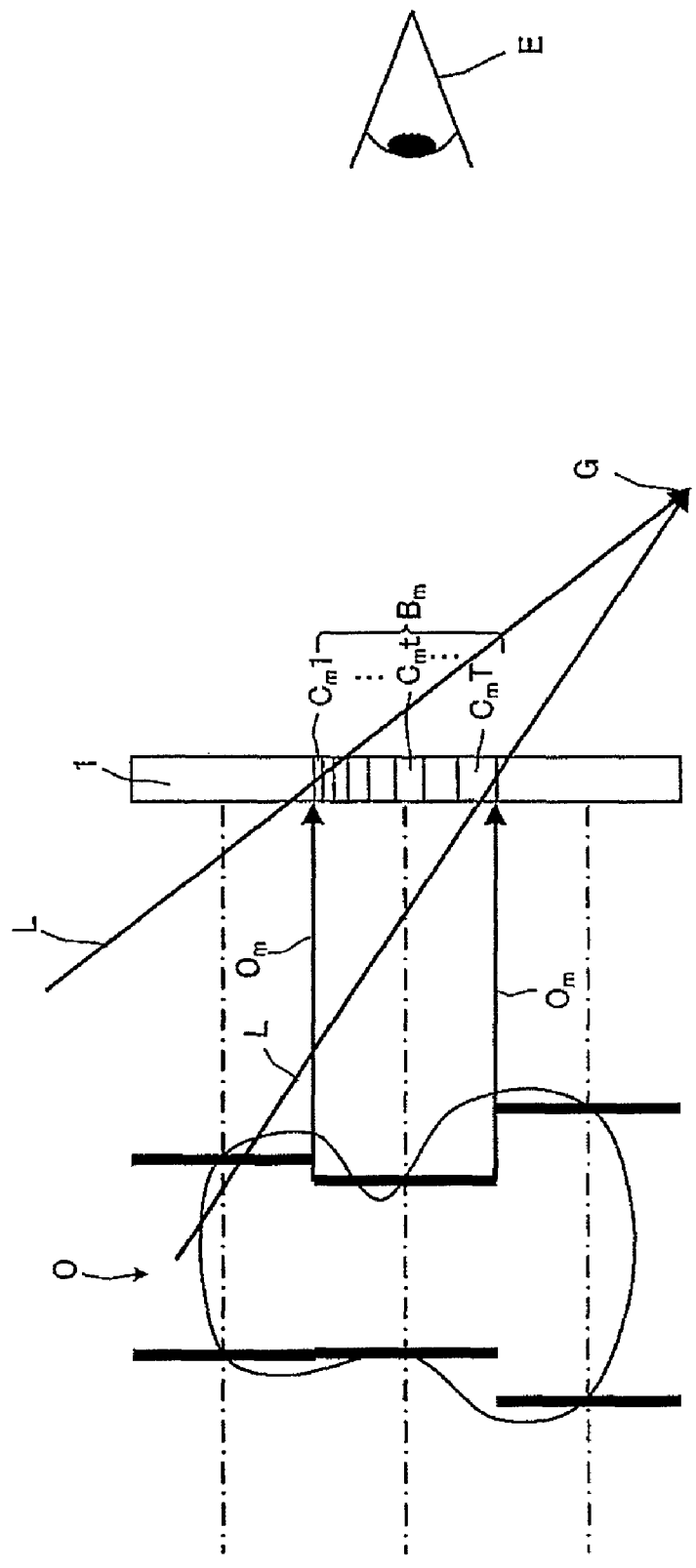
FIG. 16 is illustrative of the case where reference light L is defined by light that converges on a given position of convergence G, and object light is defined by light that does not spread in the Y direction.
Figure 17:
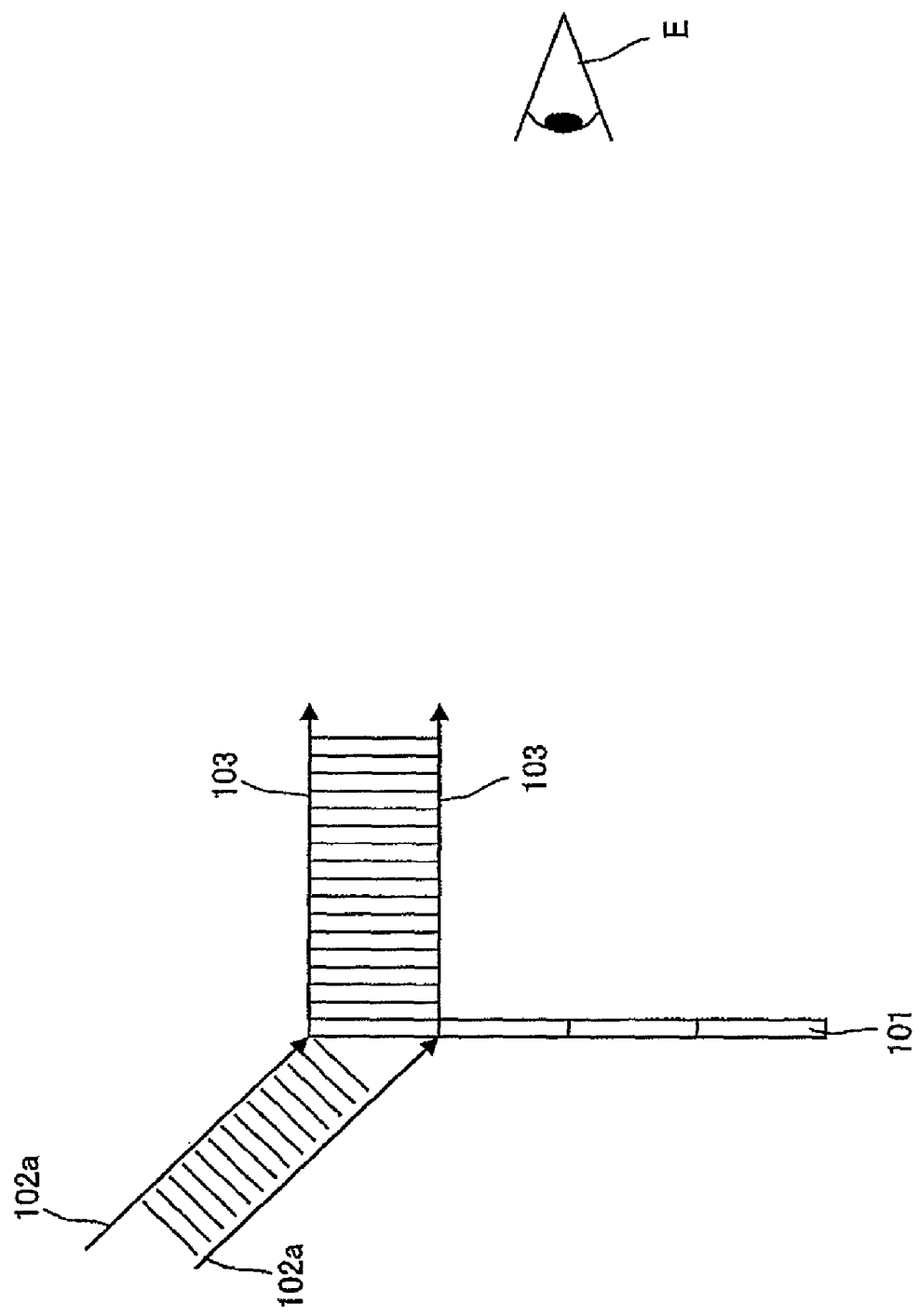
FIG. 17 is illustrative of the prior art.
Figure 18:
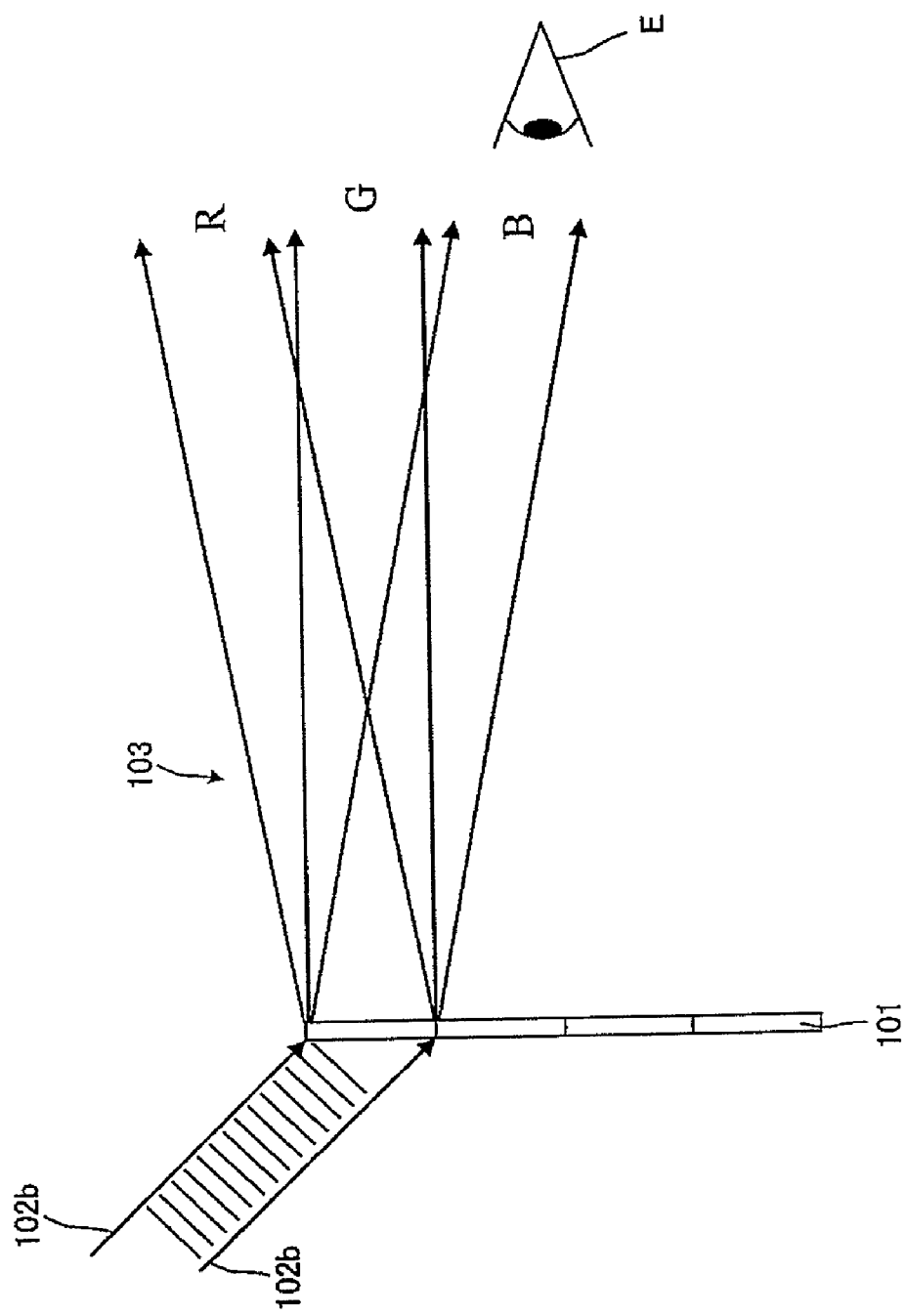
FIG. 18 is illustrative of the prior art.

FIG. 16 is illustrative of the case where the reference light L converges on the given position of convergence G for each unit area, and the object light does not spread out in the Y direction. When, as shown in FIG. 16, the reference light L converges on the given position of convergence G in the Y direction for each unit area Bm and the object light Om is set as a linear light source out of which light does not spread, the interference fringes in the unit area. Bm of the master CGH 1 appear such that the interference fringe pitches Cm1, Cm2, Cm3, ..., Cmt, ... CmT spread out from above to below the paper. That is, the master CGH 1 is fabricated such that the spatial frequency on the side of the interference fringe pitch Cm1 becomes high whereas the spatial frequency on the side of the interference fringe pitch CmT becomes low. Alternatively, the position of convergence G in the Y direction may be located on the side of the hologram opposite to the viewer. In this case, the master CGH 1 is fabricated such that the spatial frequency on the Cm1 side becomes high and the spatial frequency on the CmT side becomes low with respect to the Y-direction space.

Thus, if the master CGH 1 is fabricated such that there are differences in the Y-direction interference fringe pitches Cm1, Cm2, Cm3, ..., Cmt, ... CmT in the unit area, there is then a change in the angle of spreading of the diffracted light 3 in the Y direction so that it can have a wider viewing angle in the Y direction. Moreover, when white light is used as the reconstructing illumination light 2, the Y-direction viewing angle can become wider so that viewing in white is possible.

While the inventive computer-generated hologram fabrication process and the computer-generated hologram fabricated by that process have been explained with reference to some embodiments, it is understood that the present invention is never limited to them; so various modifications are possible. For instance, computer-generated holographic stereogram techniques such as the ones proposed in Patent Publications 6 and 7 may be applied to the inventive computer-generated hologram.

What is claimed is:

1. A fabrication process for a computer-generated hologram wherein amplitude information and phase information are recorded on a given recording surface by means of computation by a computer, characterized by comprising:
    a step of setting a first direction and a second direction orthogonal to said first direction in said computer-generated hologram,
    a step of setting parallax in said first direction alone,
    a step of setting unit areas, each one having a given width in said second direction, and
    a step of creating, in each unit area, a diffraction pattern having a spatial frequency that varies in said second direction.

2. The computer-generated hologram fabrication process according to claim 1, characterized in that said step of setting a diffraction pattern having a spatial frequency that varies in the second direction is a step wherein said spatial frequency is gradually changed from one to another of said second direction.

3. The computer-generated hologram fabrication process according to claim 1, characterized by further comprising a step of recording an object to be recorded, using object light that spreads from a point light source set on the object to be recorded in said first direction and from a position different from said point light source in said second direction.

4. The computer-generated hologram fabrication process according to claim 1, characterized by further comprising a step of recording an object to be recorded, using object light that spreads from a linear light source set on the object to be recorded in said first direction and has a constant width in said second direction, and using reference light that converges on a given position determined for each unit area with respect to said second direction.

5. The computer-generated hologram fabrication process according to claim 1, characterized by further comprising a step of making said diffraction pattern from interference fringes.

6. The computer-generated hologram fabrication process according to claim 1, characterized by further comprising a step of making said diffraction pattern from a pattern capable of modulating a phase and amplitude.

7. A computer-generated hologram, which is fabricated by the computer-generated hologram fabrication process according to claim 1.

8. A computer-generated hologram wherein amplitude information and phase information are recorded on a given recording surface by means of computation by a computer, characterized by comprising:
    a first direction and a second direction orthogonal to said first direction,
    parallax in said first direction alone,
    unit areas, each one having a given width in said second direction, and
    a diffraction pattern in each unit area that has a spatial frequency that varies in said second direction.

9. The computer-generated hologram according to claim 8, characterized in that the spatial frequency of said diffraction pattern that varies in the second direction changes gradually from one to another in each unit area.

* * * * *